United States Patent
Wen et al.

(10) Patent No.: US 10,222,676 B2
(45) Date of Patent: Mar. 5, 2019

(54) POLARIZATION INSENSITIVE INTEGRATED OPTICAL MODULATOR

(71) Applicant: Futurewei Technologies, Inc., Plano, TX (US)

(72) Inventors: Yangjing Wen, Cupertino, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/417,569

(22) Filed: Jan. 27, 2017

(65) Prior Publication Data

US 2018/0217468 A1    Aug. 2, 2018

(51) Int. Cl.
*H04B 10/50* (2013.01)
*G02F 1/225* (2006.01)
(Continued)

(52) U.S. Cl.
CPC ......... *G02F 1/2257* (2013.01); *H04B 10/505* (2013.01); *H04B 10/532* (2013.01);
(Continued)

(58) Field of Classification Search
CPC .............. H04B 10/532; H04B 10/5561; H04J 14/0246; G02F 1/2257; G02F 2203/07; G02F 2203/06; G02F 2001/212
See application file for complete search history.

(56) References Cited

U.S. PATENT DOCUMENTS 5,069,520 A    12/1991  Calvani et al.
5,495,366 A    2/1996   Esman et al.
(Continued)

FOREIGN PATENT DOCUMENTS

CN    1369153 A    9/2002
CN    1900768 A    1/2007
(Continued)

OTHER PUBLICATIONS

Partial English Translation and Abstract of Chinese Patent Application No. CN102820945, dated Sep. 21, 2016, 4 pages.
(Continued)

*Primary Examiner* — Thomas A Hollweg
*Assistant Examiner* — Mary A El-Shammaa
(74) *Attorney, Agent, or Firm* — Conley Rose, P.C.

(57) ABSTRACT

A method of modulation implemented by a polarization insensitive integrated optical modulator (PIIOM). The method includes receiving, at an input, a continuous wave (CW) light, splitting, by a first polarization splitter-rotator (PSR), the CW light into a first light beam having a transverse electric (TE) polarization and a second light beam having a transverse magnetic (TM) polarization, rotating, by the first PSR, the second light beam having the TM polarization to generate a third light beam having the TE polarization, modulating, with a multiport modulator, the first light beam with data to generate a first output signal and the third light beam with data to generate a second output signal, combining, by a second PSR, the first output signal and the second output signal to form a modulated output CW light, and transmitting, at an output separate from the input, the modulated output CW light to an optical receiving device.

20 Claims, 5 Drawing Sheets

(51) Int. Cl.
*H04B 10/532* (2013.01)
*H04B 10/556* (2013.01)
*G02F 1/21* (2006.01)
*H04J 14/02* (2006.01)

(52) U.S. Cl.
CPC ... *H04B 10/5561* (2013.01); *G02F 2001/212* (2013.01); *G02F 2203/06* (2013.01); *H04J 14/0246* (2013.01)

(56) References Cited

U.S. PATENT DOCUMENTS

| | | | |
|---|---|---|---|
| 5,654,818 | A | 8/1997 | Yao |
| 6,400,856 | B1 | 6/2002 | Chin |
| 6,417,957 | B1 | 7/2002 | Yao |
| 6,519,060 | B1 | 2/2003 | Liu |
| 6,580,851 | B1 | 6/2003 | Vahala et al. |
| 6,656,584 | B1 | 12/2003 | Sugimoto et al. |
| 6,751,002 | B2 | 6/2004 | Ovadia et al. |
| 7,065,272 | B2 | 6/2006 | Taillaert et al. |
| 7,251,076 | B1 | 7/2007 | Okada et al. |
| 7,327,911 | B2 | 2/2008 | Piede et al. |
| 7,428,358 | B2 | 9/2008 | Lu et al. |
| 8,131,156 | B2 | 3/2012 | Yu |
| 8,923,660 | B2 | 12/2014 | Dorin et al. |
| 8,988,753 | B2 | 3/2015 | Schwedt et al. |
| 9,203,517 | B2 | 12/2015 | Zhou et al. |
| 9,235,100 | B1* | 1/2016 | Kaplan .......... G02F 1/225 |
| 9,647,426 | B1 | 5/2017 | Fish et al. |
| 9,831,944 | B2* | 11/2017 | Izumi .......... H04B 10/073 |
| 9,979,472 | B1 | 5/2018 | Wang et al. |
| 2001/0004290 | A1 | 6/2001 | Lee et al. |
| 2002/0041562 | A1 | 4/2002 | Redmond et al. |
| 2002/0051600 | A1 | 5/2002 | Hung |
| 2003/0118280 | A1 | 6/2003 | Miyazaki et al. |
| 2003/0235370 | A1 | 12/2003 | Taillaert et al. |
| 2004/0005056 | A1 | 1/2004 | Nishioka et al. |
| 2004/0190107 | A1 | 9/2004 | Hiironen et al. |
| 2004/0247227 | A1 | 12/2004 | Eder et al. |
| 2005/0047727 | A1 | 3/2005 | Shin et al. |
| 2005/0088724 | A1 | 4/2005 | Lee et al. |
| 2005/0163503 | A1 | 7/2005 | Lee et al. |
| 2006/0093360 | A1 | 5/2006 | Kim et al. |
| 2006/0266744 | A1 | 11/2006 | Nomaru |
| 2007/0121189 | A1 | 5/2007 | Zami et al. |
| 2007/0230882 | A1 | 10/2007 | Hainberger |
| 2008/0019693 | A1 | 1/2008 | Sorin |
| 2009/0220230 | A1 | 9/2009 | Kim et al. |
| 2010/0002881 | A1 | 1/2010 | Youn et al. |
| 2010/0006784 | A1 | 1/2010 | Mack et al. |
| 2010/0119229 | A1 | 5/2010 | Roelkens et al. |
| 2010/0254719 | A1 | 10/2010 | Zhang et al. |
| 2010/0303469 | A1 | 12/2010 | Barton et al. |
| 2011/0122470 | A1 | 5/2011 | Berrettini et al. |
| 2011/0142395 | A1 | 6/2011 | Fortusini et al. |
| 2011/0273657 | A1 | 11/2011 | Collings et al. |
| 2012/0014697 | A1 | 1/2012 | Zhao et al. |
| 2012/0106963 | A1 | 5/2012 | Huang et al. |
| 2012/0301068 | A1 | 11/2012 | Meade et al. |
| 2013/0058652 | A1 | 3/2013 | Charbonnier et al. |
| 2013/0129361 | A1 | 5/2013 | Hsiao |
| 2014/0099057 | A1 | 4/2014 | Sun et al. |
| 2014/0153862 | A1 | 6/2014 | Picard et al. |
| 2014/0193152 | A1 | 7/2014 | Zhou et al. |
| 2014/0341579 | A1 | 11/2014 | Effenberger et al. |
| 2014/0348450 | A1 | 11/2014 | Kachoosangi |
| 2014/0348460 | A1 | 11/2014 | Dorin et al. |
| 2015/0063741 | A1 | 3/2015 | Menezo et al. |
| 2015/0063807 | A1 | 3/2015 | Simonneau et al. |
| 2015/0277207 | A1 | 10/2015 | Fujikata |
| 2015/0316722 | A1 | 11/2015 | Miao et al. |
| 2015/0338577 | A1 | 11/2015 | Shi et al. |
| 2016/0007105 | A1 | 1/2016 | Jeong et al. |
| 2016/0246005 | A1 | 8/2016 | Liu et al. |
| 2016/0261352 | A1* | 9/2016 | Wen .......... H04B 10/532 |
| 2016/0315699 | A1* | 10/2016 | Izumi .......... H04J 14/06 |
| 2016/0337041 | A1 | 11/2016 | Wen et al. |
| 2017/0059887 | A1 | 3/2017 | Park et al. |
| 2017/0155451 | A1 | 6/2017 | Hayakawa |
| 2017/0346592 | A1 | 11/2017 | Liu et al. |
| 2018/0143460 | A1 | 5/2018 | Wen et al. |

FOREIGN PATENT DOCUMENTS

| | | |
|---|---|---|
| CN | 100410733 C | 8/2008 |
| CN | 102143407 A | 8/2011 |
| CN | 102282509 A | 12/2011 |
| CN | 102820945 A | 12/2012 |
| CN | 103412367 A | 11/2013 |
| CN | 103424894 A | 12/2013 |
| CN | 104049375 A | 9/2014 |
| CN | 104122674 A | 10/2014 |
| CN | 104238023 A | 12/2014 |
| CN | 104297947 A | 1/2015 |
| CN | 102820945 B | 9/2015 |
| CN | 105223647 A | 1/2016 |
| CN | 104049375 B | 2/2016 |
| JP | H11167090 A | 6/1999 |
| JP | 2012203334 A | 10/2012 |
| JP | 2013530613 A | 7/2013 |
| TW | 476012 B | 2/2002 |
| WO | 2014209294 A1 | 12/2014 |

OTHER PUBLICATIONS

Partial English Translation and Abstract of Chinese Patent Application No. CN104049375, dated Sep. 21, 2016, 6 pages.

Partial English Translation and Abstract of Chinese Patent Application No. CN104122674, dated Sep. 21, 2016, 6 pages.

Dai, D., et al., "Novel Concept for Ultracompact Polarization Splitter-Rotator based on Silicon Nanowires," Optics Express, vol. 19, No. 11, May 23, 2011, pp. 10940-10949.

Rajesh, K., "Data Center Network—Top of Rack (TOR) vs End of Row (EOR) Design," Feb. 9, 2012, 4 Pages.

Smith, D., et al., "Colourless 10Gb/s Reflective SOA-EAM with Low Polarization Sensitivity for Long-reach DWDM-PON Networks," ECOC 2009, VDE VERLAG GMBH, Sep. 2009, 2 pages.

Menezo, S., et al., "Reflective Silicon Mach Zehnder Modulator With Faraday Rotator Mirror effect for self-coherent transmission," OFC/NFOEC Technical Digest Optical Society of America, 2013, 3 pages.

Foreign Communication From a Counterpart Application, PCT Application No. PCT/CN2016/080513, English Translation of International Search Report dated Aug. 1, 2016, 8 pages.

Foreign Communication From a Counterpart Application, PCT Application No. PCT/CN2016/080513, English Translation of Written Opinion dated Aug. 1, 2016, 4 pages.

Office Action dated Aug. 14, 2017, 13 pages, U.S. Appl. No. 15/601,706, filed May 22, 2017.

Office Action dated Sep. 8, 2017, 29 pages, U.S. Appl. No. 15/136,396, filed Apr. 22, 2016.

Wen, et al., "Polarization Insensitive Micro Ring Modulator," U.S. Appl. No. 15/601,706, filed May 22, 2017, 39 pages.

Ng, T., et al., "Sagnac-loop phase shifter with polarization-independent operation," Review of Scientific Instruments 82, 013106, 2011, 4 pages.

Chen, S., et al., "Full-duplex bidirectional data transmission link using twisted lights multiplexing over 1.1-km orbital angular momentum fiber," Scientific Reports, Nov. 30, 2016, 7 pages.

Liu, J., "Demonstration of polarization-insensitive spatial light modulation using a single polarization-sensitive spatial light modulator," Scientific Reports, Jul. 6, 2015, 7 pages.

Shieh, W., et al., "Theoretical and experimental study on PMD-supported transmission using polarization diversity in coherent optical OFDM systems," Optics Express, vol. 15, No. 16, Aug. 6, 2007, 12 pages.

Yunhong, D., et al., "Polarization diversity DPSK demodulator on the silicon-on-insulator platform with simple fabrication," Optics Express, vol. 21, No. 6, 2013, 8 pages.

(56) References Cited

OTHER PUBLICATIONS

Zou, "An SOI Based Polarization Insensitive Filter for All-optical Clock Recovery," Optics Express, vol. 22, No. 6, Mar. 2014, pp. 6647-6652.
Luo, et al., Time- and Wavelength-Division Multiplexed Passive Optical Network (TWDM-PON) for Next-Generation PON Stage 2 (NG-PON2), in Journal of Lightwave Technology, vol. 31, No. 4, Feb. 15, 2013, pp. 587-593.
Watts, M., et al., "Low-Voltage, Compact, Depletion-Mode, Silicon Mach-Zehnder Modulator," IEEE Journal of Selected Topics in Quantum Electronics, vol. 16, No. 1, Jan./Feb. 2010, pp. 159-164.
Patel, D., et al., "A Lumped Michelson Interferometric Modulator in Silicon," CLEO, Optical Society of America, 2014, 2 pages.
Zhang, J., et al., "A tunable polarization diversity silicon photonics filter," Optics Express, vol. 19, No. 14, Jul. 4, 2011, 10 pages.
Fukuda, H., et al., "Silicon photonic circuit with polarization diversity," Optics Express, vol. 16, No. 7, Mar. 31, 2008, 9 pages.
Foreign Communication From a Counterpart Application, PCT Application No. PCT/CN2017/110881, English Translation of International Search Report dated Jan. 31, 2018, 7 pages.
Foreign Communication From a Counterpart Application, PCT Application No. PCT/CN2017/110881, English Translation of Written Opinion dated Jan. 31, 2018, 4 pages.
Office Action dated Apr. 23, 2018, 3 pages, U.S. Appl. No. 15/601,706, filed May 22, 2017.
Office Action dated Jan. 31, 2018, 25 pages, U.S. Appl. No. 15/601,706, filed May 22, 2017.
Office Action dated Feb. 6, 2018, 29 pages, U.S. Appl. No. 15/136,396, filed Apr. 22, 2016.
Office Action dated Feb. 13, 2017, 21 pages, U.S. Appl. No. 15/357,199, filed Nov. 21, 2016.
Office Action dated Aug. 11, 2017, 33 pages, U.S. Appl. No. 15/357,199, filed Nov. 21, 2016.
Office Action dated Dec. 15, 2017, 16 pages, U.S. Appl. No. 15/357,199, filed Nov. 21, 2016.
Machine Translation and Abstract of Japanese Publication No. JPH11167090, dated Jun. 22, 1999, 9 pages.
Dai, D., et al., "Passive technologies for future large-scale photonic integrated circuits on silicon: polarization handling, light non-reciprocity and loss reduction," Light: Science & Applications, 2012, 12 pages.
Foreign Communication From a Counterpart Application, PCT Application No. PCT/CN2018/073645, English Translation of International Search Report dated Apr. 23, 2018, 6 pages.
Foreign Communication From a Counterpart Application, PCT Application No. PCT/CN2018/073645, English Translation of Written Opinion dated Apr. 23, 2018, 5 pages.
Office Action dated Jun. 14, 2018, 18 pages, U.S. Appl. No. 15/357,199, filed Nov. 21, 2016.
Office Action dated Sep. 7, 2018, 83 pages, U.S. Appl. No. 15/602,909, filed May 23, 2017.
Machine Translation and Abstract of Chinese Publication No. CN102143407, dated Aug. 3, 2011, 24 pages.
Machine Translation and Abstract of Chinese Publication No. CN105223647, dated Jan. 6, 2016, 35 pages.
Machine Translation and Abstract of Chinese Publication No. CN103412367, dated Nov. 27, 2013, 13 pages.
Machine Translation and Abstract of Chinese Publication No. CN104238023, dated Dec. 24, 2014, 12 pages.
Foreign Communication From a Counterpart Application, PCT Application No. PCT/CN2018/087982, English Translation of International Search Report dated Aug. 14, 2018, 4 pages.
Foreign Communication From a Counterpart Application, PCT Application No. PCT/CN2018/087733, English Translation of International Search Report dated Sep. 5, 2018, 6 pages.
Foreign Communication From a Counterpart Application, PCT Application No. PCT/CN2018/087733, English Translation of Written Opinion dated Sep. 5, 2018, 4 pages.
Machine Translation and Abstract of Japanese Publication No. JP2012203334, dated Oct. 22, 2012, 11 pages.
Yao, S., "Polarization Insensitive Antenna Remoting Link with Frequency Conversion Gain," IEEE Photonics Technology Letters, vol. 12, No. 10, Oct. 2000, pp. 1382-1384.
Charbonnier, B., et al., "Silicon Photonics for Next Generation FDM/FDMA PON," J. Opt Commun. Netw., vol. 4, No. 9, Sep. 2012, pp. A29-A37.
Esman, R.D., et al., "Polarization-Independent Fiber-Optic Microwave Modulator," Summer Tropical Meeting Digest on Optical Microvave Interactions, Jul. 19, 1993, pp. 31-32.
Foreign Communication From a Counterpart Application, Japanese Application No. 2017-559501, Japanese Office Action dated Oct. 2, 2018, 8 pages.
Foreign Communication From a Counterpart Application, Japanese Application No. 2017-559501, English Translation of Japanese Office Action dated Oct. 2, 2018, 10 pages.

* cited by examiner

POLARIZATION INSENSITIVE INTEGRATED OPTICAL MODULATOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

For short reach optical networks (e.g., a data center, a centralized radio access network (C-RAN), a wave-division multiplexing passive optical network (WDM-PON), etc.) remote modulation with carrier distribution is a promising technology. Using such technology, costs may be reduced by sharing centralized light sources.

An external modulator (e.g., silicon (Si) modulator) suitable for remote modulation may be packaged in non-hermetic form and operated in a high temperature environment without the need for a thermoelectric cooler (TEC). However, the external modulator has some practical drawbacks. For example, an external modulator such as silicon Mach-Zehnder modulators (MZM) is dependent on the polarization orientation of the incoming optical carrier.

SUMMARY

In an embodiment, the disclosure includes a method of modulation implemented by a polarization insensitive integrated optical modulator (PIIOM) including receiving, at an input, a continuous wave (CW) light, splitting, by a first polarization splitter-rotator (PSR), the CW light into a first light beam having a transverse electric (TE) polarization and a second light beam having a transverse magnetic (TM) polarization, rotating, by the first PSR, the second light beam having the TM polarization to generate a third light beam having the TE polarization, modulating, with a multiport modulator, the first light beam with data to generate a first output signal and the third light beam with data to generate a second output signal, combining, by a second PSR, the first output signal and the second output signal to form a modulated output CW light, and transmitting, at an output separate from the input, the modulated output CW light to an optical receiving device.

In an embodiment, the multiport modulator is a four-port modulator. In an embodiment, the method further includes receiving the third light beam at a first port of the multiport modulator and receiving the first light beam at a second port of the multiport modulator, wherein the first port and the second port are on substantially opposing sides of the multiport modulator. In an embodiment, the method further includes outputting the first output signal at a third port of the multiport modulator and outputting the second output signal at a fourth port of the multiport modulator, wherein the third port and the fourth port are on substantially opposing sides of the multiport modulator. In an embodiment, the second port and the fourth port are on a substantially opposite side of the multiport modulator relative to the first port and the third port of the multiport modulator. In an embodiment, the multiport modulator includes a first coupler configured to receive the third light beam and output the first output signal, and wherein the multiport modulator includes a second coupler configured to receive the first light beam and output the second output signal. In an embodiment, the first coupler and the second coupler are each 50/50 couplers at opposite ends of a pair of waveguide arms. In an embodiment, the multiport modulator comprises a four-port Mach-Zehnder modulator (MZM). In an embodiment, the multiport modulator comprises a four-port in-phase quadrature modulator (IQM) including an in-phase (I) modulator and a quadrature (Q) modulator.

In an embodiment, the disclosure includes an apparatus including an input configured to receive a continuous wave (CW) light, a first polarization splitter-rotator (PSR) operably coupled to the input and configured to split the CW light into a first light beam having a transverse electric (TE) polarization and a second light beam having a transverse magnetic (TM) polarization, and rotate the second light beam having the TM polarization to generate a third light beam having the TE polarization, a multiport modulator operably coupled to the first PSR and configured to receive the third light beam at a first port on a first side of the multiport modulator, receive the first light beam at a second port on a second side of the multiport modulator opposite the first side, modulate the first light beam with data to generate a first output signal, modulate the third light beam with the data to generate a second output signal, output the first output signal at a third port of the multiport modulator; and output the second output signal at a fourth port of the multiport modulator, and a second PSR operably coupled to the multiport modulator and configured to combine the first output signal and the second output signal to form a modulated output CW light, and an output operably coupled to the second PSR and configured to output the modulated output CW light to an optical receiving device, wherein the output is separate from the input.

In an embodiment, the apparatus is a polarization insensitive integrated optical modulator (PIIOM). In an embodiment, the first port and the third port are on substantially opposite sides of the multiport modulator relative to the second port and the fourth port. In an embodiment, the apparatus includes a first coupler configured to receive the third light beam and output the first output signal, and wherein the apparatus includes a second coupler configured to receive the first light beam and output the second output signal. In an embodiment, the first coupler and the second coupler are 2×2 couplers. In an embodiment, the multiport modulator comprises a Mach-Zehnder modulator (MZM). In an embodiment, the multiport modulator is an in-phase quadrature modulator (IQM) including an in-phase (I) modulator and a quadrature (Q) modulator disposed between the first coupler and the second coupler.

In an embodiment, the disclosure includes a transmission-type modulator having an input separate from an output including a first polarization splitter-rotator (PSR) configured to split a continuous wave (CW) light received at the input into a first light beam having a transverse electric (TE) polarization and a second light beam having a transverse magnetic (TM) polarization, and rotate the second light beam having the TM polarization to generate a third light beam having the TE polarization, a multiport modulator operably coupled to the first PSR and configured to receive the third light beam at a first port the multiport modulator, receive the first light beam at a second port of the multiport modulator, modulate the first light beam with data to generate a first output signal, modulate the third light beam with the data to generate a second output signal, output the first output signal at a third port of the multiport modulator, and output the second output signal at a fourth port of the multiport modulator, and a second PSR operably coupled to the multiport modulator and configured to combine the first output signal and the second output signal to form a modulated output signal, and provide the modulated output signal to the output.

In an embodiment, the first port and the third port are on substantially opposite sides of the multiport modulator relative to the second port and the fourth port. In an embodiment, the multiport modulator is one of a four-port Mach-Zehnder modulator (MZM) or a four-port in-phase quadrature modulator (IQM) including an in-phase (I) modulator and a quadrature (Q) modulator. In an embodiment, the transmission-type modulator is implemented in one of a remote radio unit (RRU), an end of row (EOR) switch, a top of rack (TOR) switch, a data center, or a wave-division multiplexing data center.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
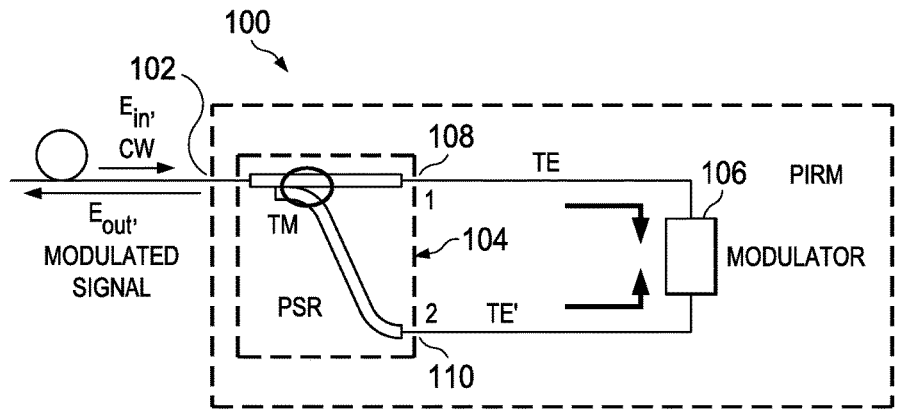
FIG. 1 is a schematic diagram of a polarization insensitive reflective modulator (PIRM).

FIG. 1 is a schematic diagram of a PIRM 100. As shown, the PIRM 100 includes a combined input/output 102, a single polarization splitter-rotator (PSR) 104, and a modulator 106. The PIRM 100 may include other components in practical applications. The input/output 102 of the PIRM 100 is configured to receive a continuous wave (CW) light, which is labeled $E_{in}$, CW in FIG. 1. The CW light received at the input/output 102 is provided to the PSR 104. The PSR 104 splits the CW light into a first light beam having a transverse electric (TE) polarization, which is labeled TE in FIG. 1, and a second light beam having a transverse magnetic (TM) polarization, which is labeled TM is FIG. 1. The PSR 104 rotates the second light beam having the TM polarization to generate a third light beam having the TE polarization, which is labeled TE' in FIG. 1. The first light beam is output from the PSR 104 at a first port 108 and the third light beam is output from the PSR 104 at a second port 110.

After exiting the PSR 104, the first light beam and the third light beam are provided to the modulator 106. As oriented in FIG. 1, the first light beam enters the top of the modulator 106 and the third light beam enters the bottom of the modulator 106. However, the light beams may otherwise enter the modulator in other applications (e.g., from a left side and a right side as oriented in FIG. 1). In general, because the PIRM 100 is a reflective-type modulator the two light beams enter the modulator 106 from opposite directions.

The modulator 106 modulates the first light beam with data to generate a first output signal and modulates the third light beam with data to generate a second output signal. As oriented in FIG. 1, the first output signal exits the bottom of the modulator 106 and the second output signal exits the top of the modulator 106.

The single PSR 104 combines the first output signal and the second output signal to generate a modulated output CW light, which is labeled $E_{out}$, modulated signal in FIG. 1. The modulated output CW light is output from the PIRM 100 using the combined input/output 102. Because the modulated output CW light and the CW light both utilize the combined input/output 102 of the PIRM 100, the PIRM 100 is referred to as a reflective-type modulator.

The PIRM 100 is capable of high-speed operations and is able to use a single fiber for both input and output (i.e., carrier distribution and uplink data transmission). Despite the benefits of the PIRM 100, in some applications a transmission-type modulator having a separate input and output is desired.

Disclosed herein is a transmission-type polarization insensitive integrated optical modulator (PIIOM). As will be more fully explained below, the PIIOM provides certain advantages over other types of modulators. For example, the polarization dependence of an incoming optical carrier wave is eliminated when the PIIOM is used. This makes external modulation a reality. In addition, there is no need to separate the carrier and uplink signal when using the PIIOM because the PIIOM uses a separate input and output. This is in contrast to the reflective-type modulator that uses a single combined input/output. Thus, the PIIOM discussed below in detail is independent of the polarization state of the incoming optical carrier and is a transmission-type modulator.

Figure 2:
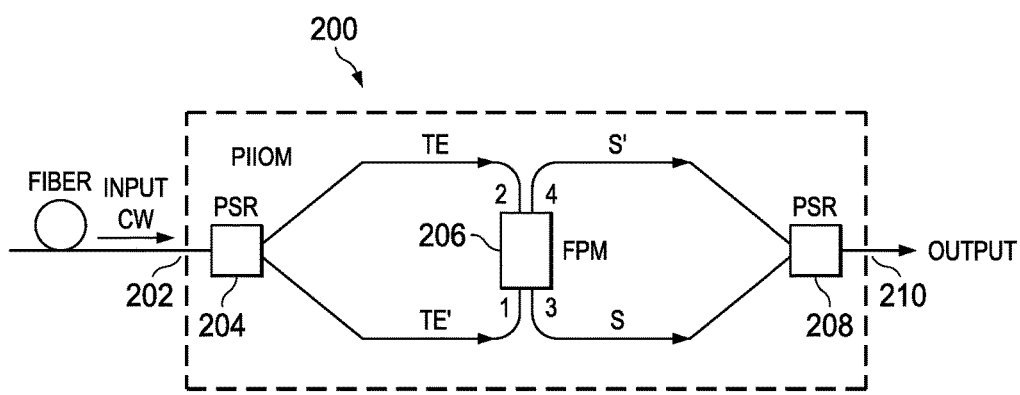
FIG. 2 is a schematic diagram of an embodiment of a polarization insensitive integrated optical modulator (PIIOM).

FIG. 2 is a schematic diagram of an embodiment of a PIIOM 200. The PIIOM 200 includes an input 202, a first PSR 204, a multiport modulator 206, a second PSR 208, and an output 210. The input 202 is configured to receive a CW light, which is labeled Input CW in FIG. 2. The CW light is transmitted to the input 202 by way of an optical fiber. The CW light received at the input 202 is provided to the first PSR 204. The first PSR 204 splits the CW light into a first light beam having a TE polarization and a second light beam having a TM polarization. The first PSR 204 also rotates the second light beam having the TM polarization to generate a third light beam having the TE polarization. The first light beam is labeled TE in FIG. 2 and the third light beam is labeled TE' in FIG. 2. As oriented in FIG. 2, the first light beam is output from a top of the first PSR 204 and the third light beam is output from a bottom of the first PSR 204.

After exiting the first PSR 204, the first light beam and the third light beam are provided to the modulator 206. In an embodiment, the modulator 206 is a four-port modulator. The first light beam enters port 2 of the modulator 206, which is labeled with a 2, and the third light beam enters port 1 of the modulator 206, which is labeled with a 1. As shown, the first and third light beams enter the modulator 206 from opposite directions (e.g., from the top and the bottom as oriented in FIG. 2).

The modulator 206 modulates the first light beam with data to generate a first output signal, which is labeled S in FIG. 2, and modulates the third light beam with data to generate a second output signal, which is labeled S' in FIG. 2. As oriented in FIG. 2, the first output signal exits from port 3, which is labeled with a 3, of the modulator 206 and the second output signal exits from port 4, which is labeled with a 4, of the modulator 206. As shown, the first and second output signals exit the modulator 206 from opposite directions (e.g., from the bottom and the top as oriented in FIG. 2).

The second PSR 208 receives the first and second output signals from the modulator 206. The second PSR 208 combines the first output signal and the second output signal to generate a modulated output CW light, which is labeled Output in FIG. 2. The modulated output CW light is output from the PIIOM 200 onto an optical fiber and to, for example, a device configured to receive a modulated optical signal (e.g., an optical receiver). Because the output 210 for the modulated output CW light is separate from the input 202 for the CW light, the PIIOM 200 is referred to as a transmission-type modulator.

Figure 3:
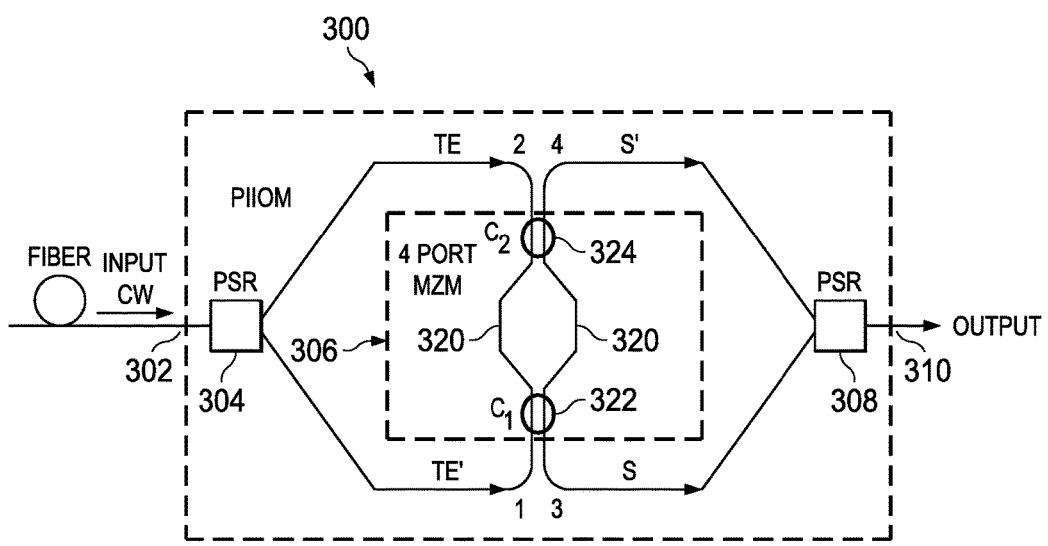
FIG. 3 is a schematic diagram of an embodiment of a PIIOM including a four-port Mach-Zehnder modulator (MZM).

FIG. 3 is a schematic diagram of an embodiment of a PIIOM 300. The PIIOM 300 of FIG. 3 is similar to the PIIOM 200 of FIG. 2. Indeed, the PIIOM 300 includes an input 302, a first PSR 304, a multiport modulator 306, a second PSR 308, and an output 310 similar to the input 202, the first PSR 204, the multiport modulator 206, the second PSR 208, and the output 210 of the PIIOM 200 of FIG. 2. However, the multiport modulator 306 of the PIIOM 300 is a four-port MZM. As such, the multiport modulator 306 includes a pair of waveguide arms 320 disposed between a first coupler 322 and a second coupler 324.

The input 302 is configured to receive the CW light, which is labeled Input CW in FIG. 3. The CW light is transmitted to the input 302 by way of an optical fiber. The CW light received at the input 302 is provided to the first PSR 304. The first PSR 304 splits the CW light into a first light beam having a TE polarization and a second light beam having a TM polarization. The first PSR 304 also rotates the second light beam having the TM polarization to generate a third light beam having the TE polarization. The first light beam is labeled TE in FIG. 3 and the third light beam is labeled TE' in FIG. 3. As oriented in FIG. 3, the first light beam is output from a top of the first PSR 304 and the third light beam is output from a bottom of the first PSR 304.

After exiting the first PSR 304, the first light beam and the third light beam are provided to the modulator 306, which in FIG. 3 is a four-port MZM. The first light beam enters port 2 of the modulator 306, which is labeled with a 2, and the third light beam enters port 1 of the modulator 306, which is labeled with a 1. As shown, the first and third light beams enter the modulator 306 from opposite directions (e.g., from the top and the bottom as oriented in FIG. 3).

The first light beam is received by the second coupler 324 and the third light beam is received by the first coupler 322. In an embodiment, the first coupler 322 and the second coupler 324 are 50/50 couplers. In an embodiment, the first coupler 322 and the second coupler 324 are 2×2 couplers.

The modulator 306 modulates the first light beam with data on both waveguide arms 320 to generate a first output signal, which is labeled S in FIG. 3, and modulates the third light beam with data on both waveguide arms 320 to generate a second output signal, which is labeled S' in FIG. 3. As oriented in FIG. 3, the first output signal exits from the first coupler 322 at port 3, which is labeled with a 3, of the modulator 306 and the second output signal exits from the second coupler 324 at port 4, which is labeled with a 4, of the modulator 306. As shown, the first and second output signals exit the modulator 306 from opposite directions (e.g., from the bottom and the top as oriented in FIG. 3).

The second PSR 308 receives the first and second output signals from the modulator 306. The second PSR 308 combines the first output signal and the second output signal to generate a modulated output CW light, which is labeled Output in FIG. 3. The modulated output CW light is output from the PIIOM 300 onto an optical fiber and to, for example, a device configured to receive a modulated optical signal. The PIIOM 300 may be referred to as a transmission-type modulator.

Figures 4, 5:
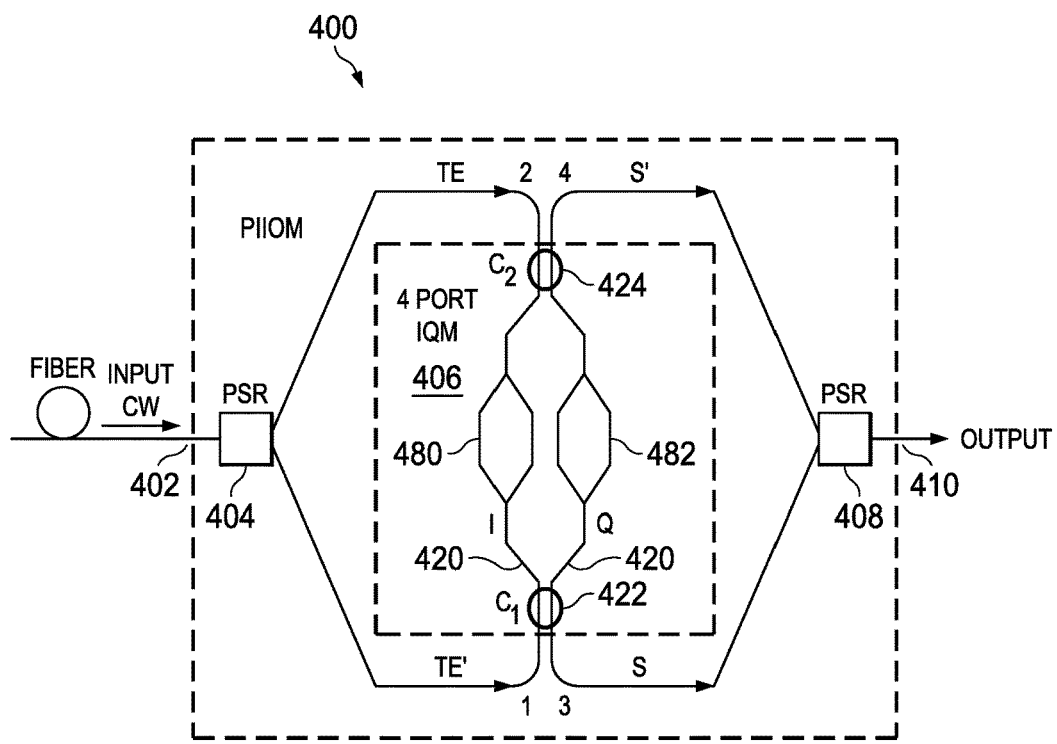
FIG. 4 is a schematic diagram of an embodiment of a PIIOM including a four-port in-phase quadrature modulator (IQM).
FIG. 5 is a schematic diagram of an embodiment of a PIIOM implemented in front haul of a wireless network.

FIG. 4 is a schematic diagram of an embodiment of a PIIOM 400. The PIIOM 400 of FIG. 4 is similar to the PIIOM 300 of FIG. 3. Indeed, the PIIOM 400 includes an input 402, a first PSR 404, a multiport modulator 406, a second PSR 408, and an output 410 similar to the input 302, the first PSR 304, the multiport modulator 306, the second PSR 308, and the output 310 of the PIIOM 300 of FIG. 3. However, the multiport modulator 406 of the PIIOM 400 is a four-port in-phase quadrature modulator (IQM). As such, the multiport modulator 406 includes a pair of waveguide arms 420 coupled to an in phase (I) modulator 480 and a quadrature (Q) modulator 482 disposed between a first coupler 422 and a second coupler 424.

The input 402 is configured to receive the CW light, which is labeled Input CW in FIG. 4. The CW light is transmitted to the input 402 by way of an optical fiber. The CW light received at the input 402 is provided to the first PSR 404. The first PSR 404 splits the CW light into a first light beam having a TE polarization and a second light beam having a TM polarization. The first PSR 404 also rotates the second light beam having the TM polarization to generate a third light beam having the TE polarization. The first light beam is labeled TE in FIG. 4 and the third light beam is labeled TE' in FIG. 4. As oriented in FIG. 4, the first light beam is output from a top of the first PSR 404 and the third light beam is output from a bottom of the first PSR 404.

After exiting the first PSR 404, the first light beam and the third light beam are provided to the modulator 406, which in FIG. 4 is a four-port IQM. The first light beam enters port 2 of the modulator 406, which is labeled with a 2, and the third light beam enters port 1 of the modulator 406, which is labeled with a 1. As shown, the first and third light beams enter the modulator 406 from opposite directions (e.g., from the top and the bottom as oriented in FIG. 4).

The first light beam is received by the second coupler 424 and the third light beam is received by the first coupler 422. In an embodiment, the first coupler 422 and the second coupler 424 are 50/50 couplers. In an embodiment, the first coupler 422 and the second coupler 424 are 2×2 couplers.

The modulator 406 modulates the first light beam with in-phase (I) and quadrature (Q) data using the I modulator 480 and Q modulator 482 respectively, each disposed on one waveguide arm 420. A ninety degree (90°) phase shift is introduced between the modulated I and Q signals, which are then combined at the first coupler 422 to generate a first output signal, which is labeled S in FIG. 4. Meanwhile, modulator 406 modulates the third light beam with I and Q data using the I modulator 480 and Q modulator 482 respectively, each disposed on one waveguide arm 420. A 90° phase shift is introduced between the modulated I and Q signals, which are then combined at the second coupler 424 to generate a second output signal, which is labeled S' in FIG. 4. As oriented in FIG. 4, the first output signal exits from the first coupler 422 at port 3, which is labeled with a 3, of the modulator 406 and the second output signal exits from the second coupler 424 at port 4, which is labeled with a 4, of the modulator 406. As shown, the first and second output signals exit the modulator 406 from opposite directions (e.g., from the bottom and the top as oriented in FIG. 4).

The second PSR 408 receives the first and second output signals from the modulator 406. The second PSR 408 combines the first output signal and the second output signal to generate a modulated output signal, which is labeled Output in FIG. 4. The modulated output signal is output from the PIIOM 400 onto an optical fiber and to, for example, a device configured to receive a modulated optical signal. The PIIOM 400 may be referred to as a transmission-type modulator.

FIG. 5 is a schematic diagram of an embodiment of a PIIOM 500 implemented in a front haul of a wireless network 550. The PIIOM 500 of FIG. 5 is similar to the PIIOM 200, 300, 400 of FIGS. 2-4. Therefore, for the sake of brevity a detailed description of the PIIOM 500 will not be repeated.

The wireless network 550 of FIG. 5 includes a baseband unit (BBU) 552 coupled to a remote radio unit (RRU) 554 by way of optical fibers. The BBU 552 includes a downlink transmitter (TX) 556 and an uplink CW 558 feeding into a multiplexer 560 labeled MUX1. The BBU 552 also includes an uplink receiver (RX) 562.

The RRU 554 includes a demultiplexer 564 labeled MUX2 feeding into a downlink receiver (RX) 566 and the PIIOM 500. In an embodiment, one or both of the multiplexer 560 and the demultiplexer 564 is a WDM multiplexer. In an embodiment, one or both of the multiplexer 560 and the demultiplexer 564 is a coarse WDM multiplexer. In an embodiment, one or both of the multiplexer 560 and the demultiplexer 564 is in the form of a Mach-Zehnder (MZ) interferometer. The downlink optical fiber couples the multiplexer 560 of the BBU 552 to the multiplexer 564 of the RRU 554. In addition, the uplink optical fiber couples the PIIOM 500 to the uplink RX 562.

In operation, the multiplexer 560 multiplexes the signal received from the downlink transmitter 556 and the CW light received from the uplink CW 558. In an embodiment, the signals have different wavelengths. For example, the downlink transmitter 556 uses downlink wavelength and the uplink CW 558 uses uplink wavelength. The multiplexer 560 transmits the multiplexed signal to the demultiplexer 564 via the downlink fiber.

The demultiplexer 564 demultiplexer the output signal to obtain the downlink wavelength and the uplink wavelength. The downlink wavelength is fed into the downlink receiver 566 and the uplink wavelength is fed into the PIIOM 500. The PIIOM 500 modulates the uplink wavelength with data and feeds the modulated output signal to the uplink receiver 562 using the uplink fiber.

Figure 6:
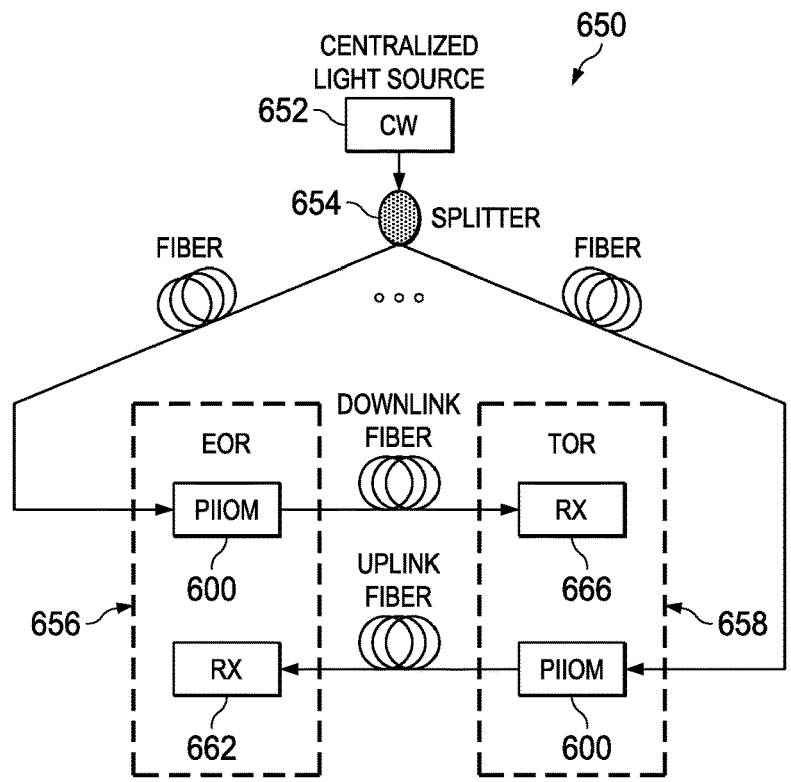
FIG. 6 is a schematic diagram of an embodiment of a PIIOM implemented in an end of row (EOR) switch and in a top of rack (TOR) switch within a data center.

FIG. 6 is a schematic diagram of an embodiment of two PIIOMs 600 implemented in a data center 650. The PIIOM 600 of FIG. 6 is similar to the PIIOM 200, 300, 400, 500 of FIGS. 2-5. Therefore, for the sake of brevity a detailed description of the PIIOM 600 will not be repeated.

The data center 650 of FIG. 6 includes a CW centralized light source 652, a splitter 654, an end of row (EOR) switch 656, and a top of rack (TOR) switch 658. The splitter 654 is configured to split the CW light received from the CW light source 652. The splitter 654 is coupled to the EOR switch 656 by an optical fiber and to the TOR switch 658 by another optical fiber. As such, the splitter 654 is configured to feed a portion of the CW light to the EOR switch 656 and another portion of the light to the TOR switch 658.

The PIIOM 600 in the EOR switch 656 modulates a portion of the CW light received from the splitter 654 and transmits the modulated signal to the downlink receiver 666 in the TOR switch 658 over a downlink fiber. Likewise, the PIIOM 600 in the TOR switch 658 modulates a portion of the CW light received from the splitter 654 and transmits the modulated signal to the uplink receiver 662 in the EOR 656 over an uplink fiber.

Figure 7:
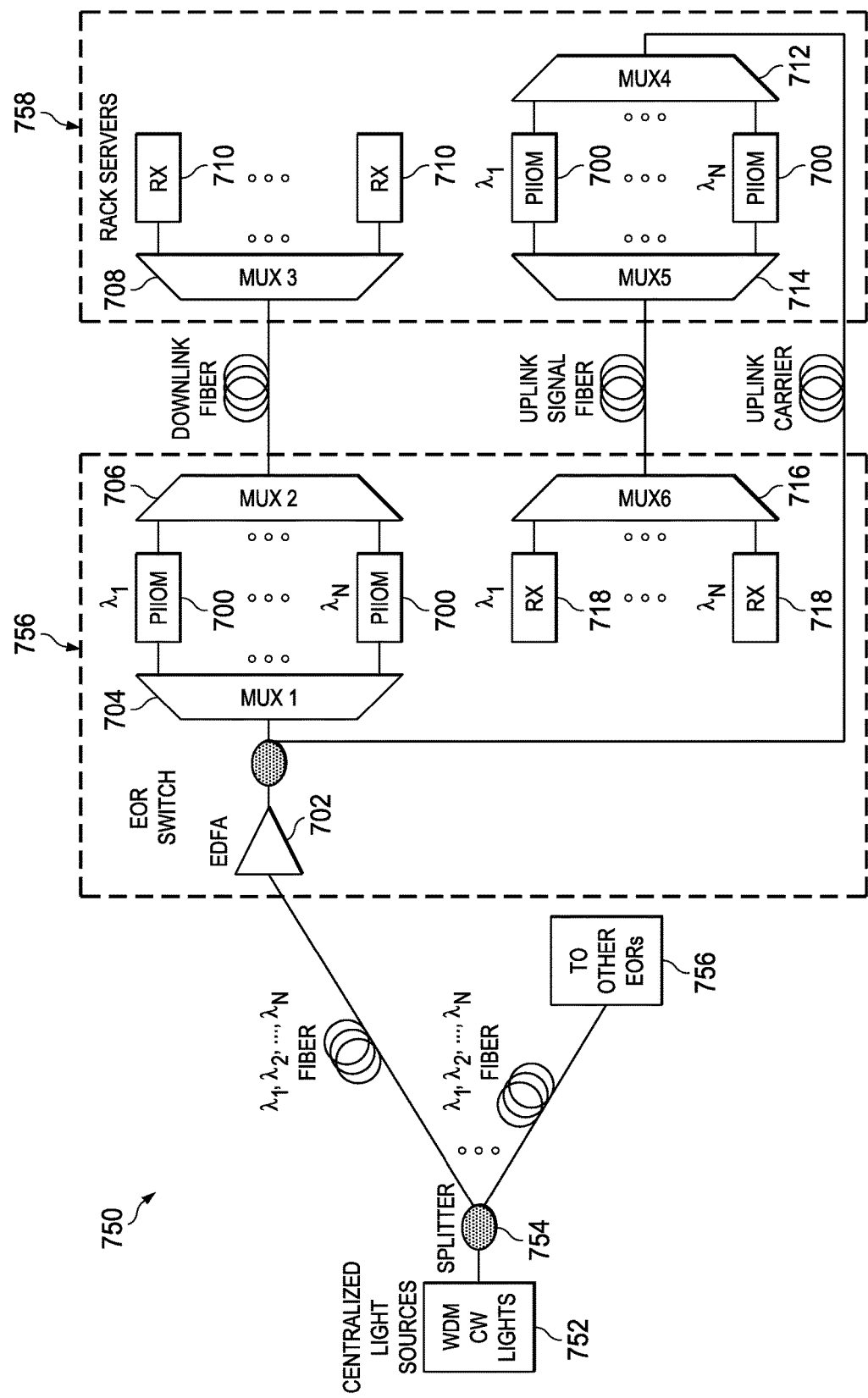
FIG. 7 is a schematic diagram of an embodiment of a plurality of PIIOMs implemented in a wave-division multiplexing (WDM) data center.

FIG. 7 is a schematic diagram of an embodiment of a plurality of PIIOM 700 implemented in a wave-division multiplexing (WDM) data center 750. The PIIOMs 700 of FIG. 7 are similar to the PIIOM 200, 300, 400, 500, 600 of FIGS. 2-6. Therefore, for the sake of brevity a detailed description of the PIIOM 600 will not be repeated.

The data center 750 of FIG. 7 includes a CW light source 752, a splitter 754, a plurality of EOR switches 756, and rack servers 758 (one rack server is shown in FIG. 7). In an embodiment, the CW light source 752 is a WDM light source and, as such, generates light at a variety of different wavelengths. The different wavelengths of light are represented as $\lambda_1, \lambda_2, \lambda_3, \ldots \lambda_N$ in FIG. 7. The splitter 754 provides the light at the plurality of wavelengths to each EOR switch 756. While each EOR switch 756 is coupled to one of the rack servers 758, only a single EOR switch 756 and rack server 758 pair is depicted in FIG. 7.

The splitter 754 is configured to split the CW light received from the CW light source 752. The splitter 754 is coupled to each of the EOR switches 756 by an optical fiber. As such, the splitter 654 is configured to feed the CW light having the plurality of wavelengths to the EOR switch 756.

The light from the splitter 754 is received by an amplifier 702 in the EOR switch 756. In an embodiment, the amplifier is an erbium-doped fiber amplifier (EDFA). After amplifying the received light, the amplifier 702 feeds the light to the demultiplexer 704 labeled MUX1 in the EOR switch 756. The amplifier 702 also feeds the light to the demultiplexer 712 labeled MUX4 in the rack server 758 over an uplink carrier fiber.

The demultiplexer 704 separates the light by wavelength and feeds one wavelength into each PIIOM 700 in the EOR switch 756. After modulation, each PIIOM 700 feeds the light into the multiplexer 706 labeled MUX2 in the EOR switch 756. The multiplexer 706 recombines the various wavelengths of light and feeds the light to the demultiplexer 708 in the rack server 708 over the downlink fiber. The demultiplexer 708 labeled MUX3 separates the light by wavelength and feeds one wavelength into each downlink receiver 710.

In similar fashion, the demultiplexer 712 labeled MUX4 in the rack server 758 separates the light by wavelength and feeds one wavelength into each PIIOM 700 in the rack server 758. After modulation, each PIIOM 700 feeds the light into the multiplexer 714 labeled MUX5 in the rack server 758. The multiplexer 714 recombines the various wavelengths of light and feeds the light to the demultiplexer 716 labeled MUX6 in the EOR switch 756 over the uplink fiber. The demultiplexer 716 separates the light by wavelength and feeds each wavelength into corresponding uplink receiver 718.

Figure 8:
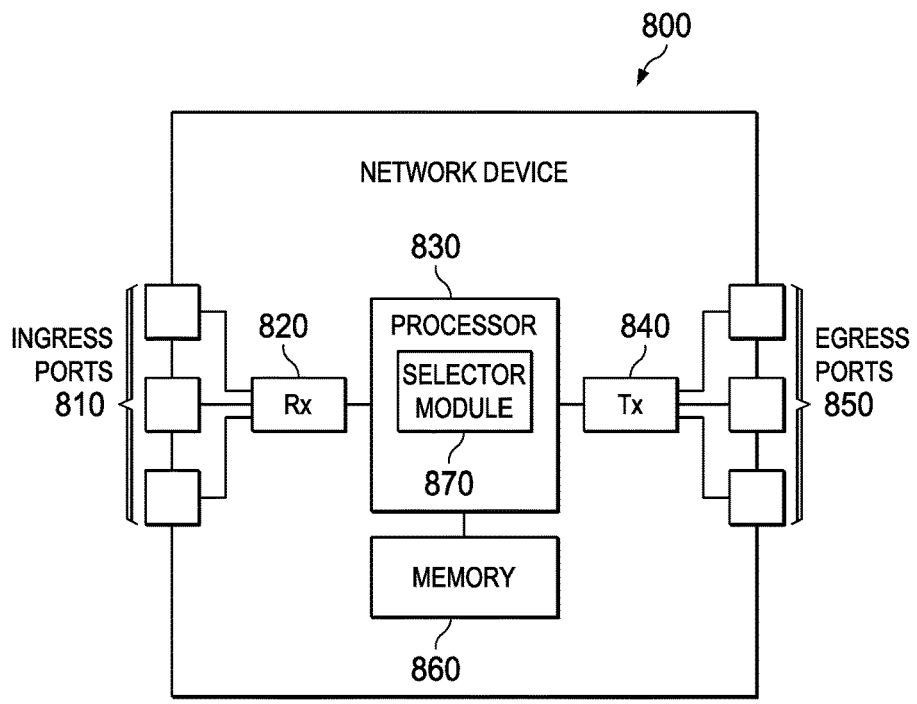
FIG. 8 is a schematic diagram of a network device.

FIG. 8 is a schematic diagram of a network device according to an embodiment of the disclosure. The device 800 is suitable for implementing the components described herein (e.g., the PIIOM 200-700 of FIGS. 2-7). The device 800 comprises ingress ports 810 and receiver units (Rx) 820 for receiving data; a processor, logic unit, or central processing unit (CPU) 830 to process the data; transmitter units (Tx) 840 and egress ports 850 for transmitting the data; and a memory 860 for storing the data. The device 800 may also comprise optical-to-electrical (OE) components and electrical-to-optical (EO) components coupled to the ingress ports 810, the receiver units 820, the transmitter units 840, and the egress ports 850 for egress or ingress of optical or electrical signals.

The processor 830 is implemented by hardware and software. The processor 830 may be implemented as one or more CPU chips, cores (e.g., as a multi-core processor), field-programmable gate arrays (FPGAs), application specific integrated circuits (ASICs), or digital signal processors (DSPs). The processor 830 is in communication with the ingress ports 810, receiver units 820, transmitter units 840, egress ports 850, and memory 860. The processor 830 comprises a selector module 870. The selector module 870 implements the disclosed embodiments described above. For instance, the selector module 870 implements the modulation performed by PIIOM 200-700 of FIGS. 2-7. The inclusion of the selector module 870 therefore provides a substantial improvement to the functionality of the device 800 and effects a transformation of the device 800 to a different state. Alternatively, the selector module 870 is implemented as instructions stored in the memory 860 and executed by the processor 830.

The memory 860 comprises one or more disks, tape drives, and solid-state drives and may be used as an overflow data storage device, to store programs when such programs are selected for execution, and to store instructions and data that are read during program execution. The memory 860 may be volatile and non-volatile and may be read-only memory (ROM), random-access memory (RAM), ternary content-addressable memory (TCAM), or static random-access memory (SRAM).

Figure 9:
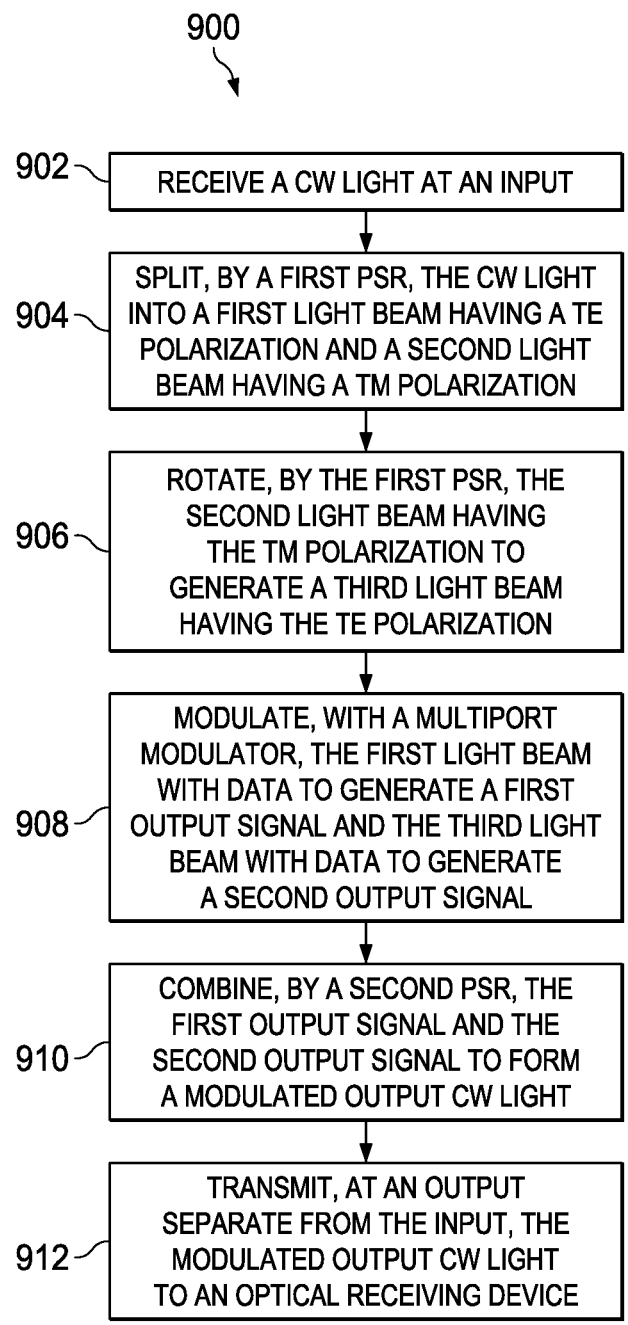
FIG. 9 is an embodiment of a method of modulation implemented by a PIIOM.

FIG. 9 is an embodiment of a method of modulation implemented by a PIIOM (e.g., the PIIOM 200-700 of FIGS. 2-7). The method may be implemented when modulation of an optical signal is desired. In block 902, a continuous wave (CW) light is received at an input (e.g., input 202-402 of FIGS. 2-4). In block 904, a first PSR (e.g., PSR 204-404 of FIGS. 2-4) splits the CW light into a first light beam having a TE polarization and a second light beam having a TM polarization. In block 906, the first PSR rotates the second light beam having the TM polarization to generate a third light beam having the TE polarization.

In block 908, a multiport modulator (e.g., modulator 206-406 of FIGS. 2-4) modulates the first light beam with data to generate a first output signal and the third light beam with data to generate a second output signal. In block 910, a second PSR (e.g., PSR 208-408 of FIGS. 2-4) combines the first output signal and the second output signal to form a modulated output CW light. In block 912, the modulated output CW light is transmitted to an optical receiving device at an output (e.g., output 210-410 of FIGS. 2-4) separate from the input.

A method of modulation implemented by a polarization insensitive integrated optical modulator (PIIOM) including receiving, at an input means, a continuous wave (CW) light, splitting, by a first polarization splitter-rotator (PSR) means, the CW light into a first light beam having a transverse electric (TE) polarization and a second light beam having a transverse magnetic (TM) polarization, rotating, by the first PSR means, the second light beam having the TM polarization to generate a third light beam having the TE polarization, modulating, with a multiport modulator means, the first light beam with data to generate a first output signal and the third light beam with data to generate a second output signal, combining, by a second PSR means, the first output signal and the second output signal to form a modulated output CW light, and transmitting, at an output means separate from the input means, the modulated output CW light to an optical receiving device.

An apparatus including an input means configured to receive a continuous wave (CW) light, a first polarization splitter-rotator (PSR) means operably coupled to the input and configured to split the CW light into a first light beam having a transverse electric (TE) polarization and a second light beam having a transverse magnetic (TM) polarization, and rotate the second light beam having the TM polarization to generate a third light beam having the TE polarization, a multiport modulator means operably coupled to the first PSR means and configured to receive the third light beam at a first port on a first side of the multiport modulator, receive the first light beam at a second port on a second side of the multiport modulator substantially opposite the first side, modulate the first light beam with data to generate a first output signal, modulate the third light beam with the data to generate a second output signal, output the first output signal at a third port of the multiport modulator means, output the second output signal at a fourth port of the multiport modulator means, and a second PSR means operably coupled to the multiport modulator means and configured to combine the first output signal and the second output signal to form a modulated output CW light, and an output means operably coupled to the second PSR means and configured to output the modulated output CW light to an optical receiving device, wherein the output means is separate from the input means.

A transmission-type modulator having an input means separate from an output means including a first polarization splitter-rotator (PSR) means configured to split a continuous wave (CW) light received at the input into a first light beam having a transverse electric (TE) polarization and a second light beam having a transverse magnetic (TM) polarization, and rotate the second light beam having the TM polarization to generate a third light beam having the TE polarization, a multiport modulator means operably coupled to the first PSR and configured to receive the third light beam at a first port the multiport modulator means, receive the first light beam at a second port of the multiport modulator means, modulate the first light beam with data to generate a first output signal, modulate the third light beam with the data to generate a second output signal, output the first output signal at a third port of the multiport modulator means, and output the second output signal at a fourth port of the multiport modulator means, a second PSR means operably coupled to the multiport modulator means and configured to combine the first output signal and the second output signal to form a modulated output signal and provide the modulated output signal to the output means.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of modulation implemented by a polarization insensitive integrated optical modulator (PIIOM), comprising:
    receiving, at an input, a continuous wave (CW) light;
    splitting, by a first polarization splitter-rotator (PSR), the CW light into a first light beam having a transverse electric (TE) polarization and a second light beam having a transverse magnetic (TM) polarization;
    rotating, by the first PSR, the second light beam having the TM polarization to generate a third light beam having the TE polarization prior to any modulation;
    modulating, with a multiport modulator, the first light beam with data to generate a first output signal and the third light beam with data to generate a second output signal;
    combining, by a second PSR, the first output signal and the second output signal to form a modulated output CW light; and
    transmitting, at an output separate from the input, the modulated output CW light to an optical receiving device.

2. The method of claim 1, wherein the multiport modulator is a four-port modulator.

3. The method of claim 1, further comprising receiving the third light beam at a first port of the multiport modulator and receiving the first light beam at a second port of the multiport modulator, wherein the first port and the second port are on substantially opposing sides of the multiport modulator.

4. The method of claim 3, further comprising outputting the first output signal at a third port of the multiport modulator and outputting the second output signal at a fourth port of the multiport modulator, wherein the third port and the fourth port are on substantially opposing sides of the multiport modulator.

5. The method of claim 4, wherein the second port and the fourth port are on a substantially opposite side of the multiport modulator relative to the first port and the third port of the multiport modulator.

6. The method of claim 1, wherein the multiport modulator includes a first coupler configured to receive the third light beam and output the first output signal, and wherein the multiport modulator includes a second coupler configured to receive the first light beam and output the second output signal.

7. The method of claim 6, wherein the first coupler and the second coupler are each 50/50 couplers at opposite ends of a pair of waveguide arms.

8. The method of claim 6, wherein the multiport modulator comprises a four-port Mach-Zehnder modulator (MZM).

9. The method of claim 1, wherein the multiport modulator comprises a four-port in-phase quadrature modulator (IQM) including an in-phase (I) modulator and a quadrature (Q) modulator.

10. An apparatus, comprising:
    an input configured to receive a continuous wave (CW) light;
    a first polarization splitter-rotator (PSR) operably coupled to the input and configured to:
        split the CW light into a first light beam having a transverse electric (TE) polarization and a second light beam having a transverse magnetic (TM) polarization; and
        rotate the second light beam having the TM polarization to generate a third light beam having the TE polarization prior to any modulation;
    a multiport modulator operably coupled to the first PSR and configured to:
        receive the third light beam at a first port on a first side of the multiport modulator;
        receive the first light beam at a second port on a second side of the multiport modulator substantially opposite the first side;
        modulate the first light beam with data to generate a first output signal;
        modulate the third light beam with the data to generate a second output signal;
        output the first output signal at a third port of the multiport modulator; and
        output the second output signal at a fourth port of the multiport modulator; and
    a second PSR operably coupled to the multiport modulator and configured to combine the first output signal and the second output signal to form a modulated output CW light; and
    an output operably coupled to the second PSR and configured to output the modulated output CW light to an optical receiving device, wherein the output is separate from the input.

11. The apparatus of claim 10, wherein the apparatus is a polarization insensitive integrated optical modulator (PIIOM).

12. The apparatus of claim 10, wherein the first port and the third port are on substantially opposite sides of the multiport modulator relative to the second port and the fourth port.

13. The apparatus of claim 10, wherein the apparatus includes a first coupler configured to receive the third light beam and output the first output signal, and wherein the apparatus includes a second coupler configured to receive the first light beam and output the second output signal.

14. The apparatus of claim 13, wherein the first coupler and the second coupler are 2×2 couplers.

15. The apparatus of claim 10, wherein the multiport modulator comprises a Mach-Zehnder modulator (MZM).

16. The apparatus of claim 13, wherein the multiport modulator is an in-phase quadrature modulator (IQM) including an in-phase (I) modulator and a quadrature (Q) modulator disposed between the first coupler and the second coupler.

17. A transmission-type modulator having an input separate from an output, comprising:
    a first polarization splitter-rotator (PSR) configured to:
        split a continuous wave (CW) light received at the input into a first light beam having a transverse electric (TE) polarization and a second light beam having a transverse magnetic (TM) polarization; and
        rotate the second light beam having the TM polarization to generate a third light beam having the TE polarization prior to any modulation;
    a multiport modulator operably coupled to the first PSR and configured to:
        receive the third light beam at a first port of the multiport modulator;
        receive the first light beam at a second port of the multiport modulator;
        modulate the first light beam with data to generate a first output signal;
        modulate the third light beam with the data to generate a second output signal;
        output the first output signal at a third port of the multiport modulator; and
        output the second output signal at a fourth port of the multiport modulator; and
    a second PSR operably coupled to the multiport modulator and configured to:
        combine the first output signal and the second output signal to form a modulated output signal; and
        provide the modulated output signal to the output.

18. The transmission-type modulator of claim 17, wherein the first port and the third port are on substantially opposite sides of the multiport modulator relative to the second port and the fourth port.

19. The transmission-type modulator of claim 17, wherein the multiport modulator is one of a four-port Mach-Zehnder modulator (MZM) or a four-port in-phase quadrature modulator (IQM) including an in-phase (I) modulator and a quadrature (Q) modulator.

20. The transmission-type modulator of claim 17, wherein the transmission-type modulator is implemented in one of a remote radio unit (RRU), an end of row (EOR) switch, a top of rack (TOR) switch, a data center, or a wave-division multiplexing data center.

* * * * *